United States Patent Office 3,026,294

Patented Mar. 20, 1962

3,026,294

PROCESS FOR CURING CHLOROSULFONATED POLYETHYLENE ELASTOMERS

Erwin Paul Lieberman, Wilmington, Del., assignor to E. I. du Pont de Nemours and Company, Wilmington, Del., a corporation of Delaware No Drawing. Filed Sept. 30, 1959, Ser. No. 843,336
5 Claims. (Cl. 260—45.5)

This invention is directed to the curing of chlorosulfonated polyethylene elastomers and more particularly to a method of curing said elastomers with specific organic agents as hereinafter described.

Chlorosulfonated polyethylenes are usually cured by means of oxides of certain polyvalent metals, such as lead and magnesium, in quantities of the order of 20 to 40%. These agents, although satisfactory for most purposes, obviously cannot be used where a transparent product is desired. Certain aromatic diamines, such as benzidenes (see U.S. 2,723,257) and certain polyamides containing free amino groups (see U.S. Patent 2,914,496) are used to give transparent cured films. The first type of agent (aromatic diamine) has the disadvantage of possible physiological effects. The second type (polyamide) is required in large proportions and gives films which tend to discolor on aging. Both have the disadvantage of generating hydrogen chloride on reacting with the chlorosulfonated polyethylene. This must usually be removed by using an excess of the curing agent or adding some other agent to combine with it. This gives water-soluble products such as amine hydrochlorides, which remain in the film and increase its tendency to swell in water.

It is an object of the present invention to provide a novel process for curing chlorosulfonated polyethylenes. It is a further and more specific object of this invention to provide a process for curing chlorosulfonated polyethylene to give a permanently transparent and colorless film. It is still another object of the present invention to provide a process for curing chlorosulfonated polyethylene to produce a transparent and colorless film that swells only slightly in water and which has little tendency to discolor. These and other objects will become apparent in the following description and claims.

More specifically, the present invention is directed to a process of curing an elastomeric chlorosulfonated polyethylene containing 0.75 to 3.0% of sulfur in the form of $—SO_2Cl$ groups by incorporating therein the reaction product of 2 to 4 parts (per 100 parts of elastomer) of menthane diamine (1,8-diamino paramenthane) with 1.5 to 4.0 moles (per mole of diamine) of an epoxy resin made from bis(4-hydrozyphenyl)dimethylmethane and epichlorohydrin and containing two epoxy groups per molecule.

This invention is particularly adapted to the curing of films deposited from solution in which case the reaction product of the epoxy resin and diamine is dissolved in the film-forming solution of the chlorosulfonated polyethylene. The invention also includes the case where the addition product is incorporated without solvent, for example by milling, in a solid chlorosulfonated polyethylene.

The chlorosulfonated polyethylene to be cured may be made from any solid polyethylene either linear or branched, which is soluble in carbon tetrachloride to the extent of at least 1%. Preferably, since the chief application of the present invention is to coating compositions, the more soluble polymers with melt index between 5 and 200 and preferably between 50 and 200 are used. The chlorine content of the chlorosulfonated product may range from 20 to 48% or more and the sulfur content from 0.75 to 3.0%.

The amount of curing agent used will ordinarily be that derived from 2 to 4 parts by weight of the menthane diamine per 100 parts of the chlorosulfonated polyethylene elastomer. The proportion of epoxy used with this amount of diamine to form the curing agent is critical and should be between 1.5 and 4.0 moles of resin per mole of diamine and preferably between 2 and 3. The epoxy resin may have a molecular weight between 340 and 1000 or higher but preferably between 340 and 400 and must contain two epoxy groups per molecule.

It is essential to the present novel process for the diamine and epoxy resin to react at least in part to form the curing agent before mixing with the bulk of the chlorosulfonated polyethylene. Ordinarily 16 hours at 25° C. or a corresponding shorter time at higher temperatures is sufficient. On the other hand, long standing of the curing agent in solution before use or prolonged heating at higher temperatures tends to make the catalyst less active.

Representative examples which illustrate the present invention follow.

*Example 1*

The chlorosulfonated polyethylene to be cured is made from a polyethylene of density 0.922 and melt index 100 and contains 42% chlorine and 1.6% sulfur. The sulfur is believed to be present entirely in the form of sulfonyl chloride ($—SO_2Cl$) groups. One hundred parts by weight of this is dissolved in 170 parts of xylene and 10 parts of butanol. Three parts of the menthane diamine and 15 parts of an epoxy resin (made from bis(4-hydroxyphenyl)-dimethylmethane and epichlorohydrin and having a molecular weight of about 340 and dissolved in 124 parts of xylene and 10 parts of butanol) are kept at 30° C. for 16 hours. The molecular ratio of resin to diamine is 2.5 to 1. The two solutions are then mixed and applied as a coating composition.

Films prepared from this coating composition are transparent and very nearly colorless. After curing for one hour at 135° C., they are still colorless, indicating no formation of hydrogen chloride, and have a tensile strength of 2000 lbs. per sq. in., a modulus of 600 lbs. per sq. in. at 100% elongation, and an elongation at break of 310%, with a permanent set after this elongation of only 14%. After immersion in water at 70° C. for 7 days, the cured films increase only 11% in weight. When exposed for 100 hours in a "Weather-Ometer", a device for accelerated aging in which the test sample is exposed to light from a carbon arc simulating sunlight but much stronger and to water spray (see Glossary of Terms Relating to Rubber and Rubber-Like Materials, ATSM Special Technical Bulletin No. 184), only a light tan color is developed.

When the epoxy resin is not first allowed to react with the diamine or when it is omitted altogether, the tensile strength of the films is only about 500 lbs. and the water absorption is several hundred percent.

*Example 2*

The curing agent is made from 3 parts of menthane diamine and only 10 parts of the epoxy resin used in Example 1, giving a ratio of 1.67 moles of the resin to 1 mole of the diamine. The coating composition made by mixing it with 100 parts of chlorosulfonated polyethylene as in Example 1 gives films with 1870 lbs. per sq. in. tensile strength, 875 lbs. per sq. in. modulus at 100% elongation and an elongation at break of 270%. The permanent set is 16% but the gain in weight in water is 110%. A brown color develops after 100 hours in the Weather-Ometer.

*Example 3*

The chlorosulfonated polyethylene (100 parts) used in Examples 1 and 2 is cured with an agent made by dissolving 2 parts of menthane diamine and 15 parts of the epoxy resin in 124 parts of xylene and 10 parts of butanol, giving a ratio of 3.8 moles of resin to 1 mole of the diamine, and allowing the solution to stand for 16 hours at room temperature. The films are very nearly colorless and, when cured as before have a tensile strength of 1670 lbs. per sq. in., a modulus at 100% elongation of 300 lbs. per sq. in., an elongation at break of 340% and a permanent set of 10%. They show little discoloration in the Weather-Ometer.

*Example 4*

The chlorosulfonated polyethylene (100 parts) used in the preceding examples is cured with an agent made from 3 parts of menthane diamine and 37.5 parts of an epoxy resin made from bis(4-hydroxyphenyl)dimethylmethane and epichlorohydrin and having a molecular weight of about 1000, giving a ratio of 2.5 moles of resin per mole of diamine. The two components are allowed to react as before, and then mixed with the chlorosulfonated polyethylene. The films, cured as before, are practically colorless and have a tensile strength of 1600 lbs., a 100% modulus of 500 lbs., and elongation at break of 325% and a permanent set of 10%. The absorption of water in 7 days at 70° C. is 36%.

Comparison of these examples shows that a molecular ratio of diamine to resin in the curing agent of about 1:2 gives the best results and that increasing the proportion of resin is accompanied by a decrease in tensile properties, while decreasing the proportion of resin also increases the water absorption and the tendency to discolor, indicating the formation of some hydrogen chloride. Use of an epoxy resin of higher molecular weight, but still containing two epoxy groups per molecule, gives films which still have good water resistance and color stability but which are somewhat poorer in tensile properties compared with those from epoxy resins of lower molecular weight, using the same amount of diamine.

The melt index referred to throughout this specification is the amount of melted polyethylene extruded at constant pressure and temperature through a standard orifice according to the procedure of the American Society for Testing Materials. A polymer with a higher melt index is, accordingly, more fluid when melted and has a lower molecular weight.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of curing an elastomeric chlorosulfonated polyethylene containing 0.75 to 3.0% sulfur, said sulfur being in the form of $-SO_2Cl$ groups, the improvement wherein a reaction product of (*a*) 2 to 4 parts, per 100 parts of said chlorosulfonated polyethylene, of menthane diamine and (*b*) 1.5 to 4.0 moles, per mole of said diamine, of an epoxy resin made from (1) bis(4-hydroxyphenyl)dimethylmethane and (2) epichlorohydrin, said resin containing 2 epoxy groups per resin molecule, is incorporated in said chlorosulfonated polyethylene, followed by curing the resulting composition.

2. The process of claim 1 wherein the chlorosulfonated polyethylene has a melt index between 50 and 200.

3. The process of claim 1 wherein the chlorosulfonated polyethylene has a chlorine content within the range of 20–48% by weight of said polyethylene.

4. The process of claim 1 wherein said reaction product is made from between 2 and 3 moles of epoxy resin per mole of diamine.

5. The process of claim 1 wherein the epoxy resin has a molecular weight within the range of 340–400.

References Cited in the file of this patent

UNITED STATES PATENTS

| | | |
|---|---|---|
| 2,914,496 | Kelly | Nov. 24, 1959 |
| 2,918,439 | Phillips et al. | Dec. 22, 1959 |